Oct. 9, 1923.

J. F. MUSSELMAN 1,469,804

LIQUID TREATING SYSTEM

Filed March 25, 1920    2 Sheets-Sheet 1

INVENTOR
JOSEPH F. MUSSELMAN.
by D. Anthony Usina
his Attorney

Oct. 9, 1923.

J. F. MUSSELMAN 1,469,804

LIQUID TREATING SYSTEM

Filed March 25, 1920

INVENTOR
JOSEPH F. MUSSELMAN.
by D. Anthony Usina
his Attorney

Patented Oct. 9, 1923.

1,469,804

UNITED STATES PATENT OFFICE.

JOSEPH F. MUSSELMAN, OF BRONXVILLE, NEW YORK, ASSIGNOR TO ANTI-CORROSION ENGINEERING COMPANY, OF NEW YORK, N. Y., A CORPORATION OF NEW YORK.

LIQUID-TREATING SYSTEM.

Application filed March 25, 1920. Serial No. 368,803.

*To all whom it may concern:*

Be it known that I, JOSEPH F. MUSSELMAN, a citizen of the United States, and resident of Bronxville, in the county of Westchester and State of New York, have invented certain new and useful Improvements in Liquid-Treating Systems, of which the following is a specification.

This invention relates to the treatment of liquids containing free oxygen or other corrosive gases so as to remove the corrosive gases from the liquid, either wholly or in part, and thereby overcome and prevent or lessen the corrosive action of such gases on the surfaces of metal vessels and pipes or conduits in which the liquid is contained and is conveyed from one locality to another.

The invention particularly relates to the removal of dissolved or free oxygen or other corrosive gases from water so as to deaerate the water and thereby reduce or eliminate corrosion on the surface of the metal containers or conduits used in handling the water.

While not limited to such uses, my invention is particularly applicable for use in the deaeration of the water used in hot water heating systems, such as the hot water supply for hotels, apartment houses, office buildings, dwellings and the like, and deaeration of the water used in hot water and steam heating plants and in steam generating plants, ice making plants and for similar industrial uses.

It has been established clearly that the corrosive properties of water, particularly when heated are due to the presence of the dissolved oxygen and other dissolved gases contained in the water. It is also well known that the corrosive action of these gases in the water causes rapid deterioration of the systems and is the source of considerable trouble and a source of the frequent repairs necessary in maintaining such systems in operative condition and, therefore, the cause of great expense required for upkeep of such apparatus.

It is also well known that the presence of free or dissolved gases in water prevent proper congealing and solidification of the ice in manufacturing ice.

One object of my invention is the provision of novel means whereby liquids or a mixture of liquids and gases is deaerated so as to remove dissolved oxygen and similar corrosive gases from the liquids and thereby substantially eliminate corrosion of the metal surfaces of the heating and storage vessels and piping entering into the construction of systems for heating and handling such liquids.

Another object of the invention is the provision of improved means whereby the separation of dissolved oxygen and similar corrosive gases from water and like liquids is easily and quickly accomplished, and whereby the separation of the gases from the liquid is effected under a gradually reducing head and without effervescence.

Still further objects of the invention will be made apparent by reference to the drawings and detailed description of the invention and to the appended claims forming part of the specification.

Referring now to the drawings, which are largely diagrammatic, forming part of this specification, Figure 1 is a sectional elevation showing one arrangement of a water heating and distributing system embodying my invention, and applied for use as a hot water supply system in accordance with my invention.

Figure 1:
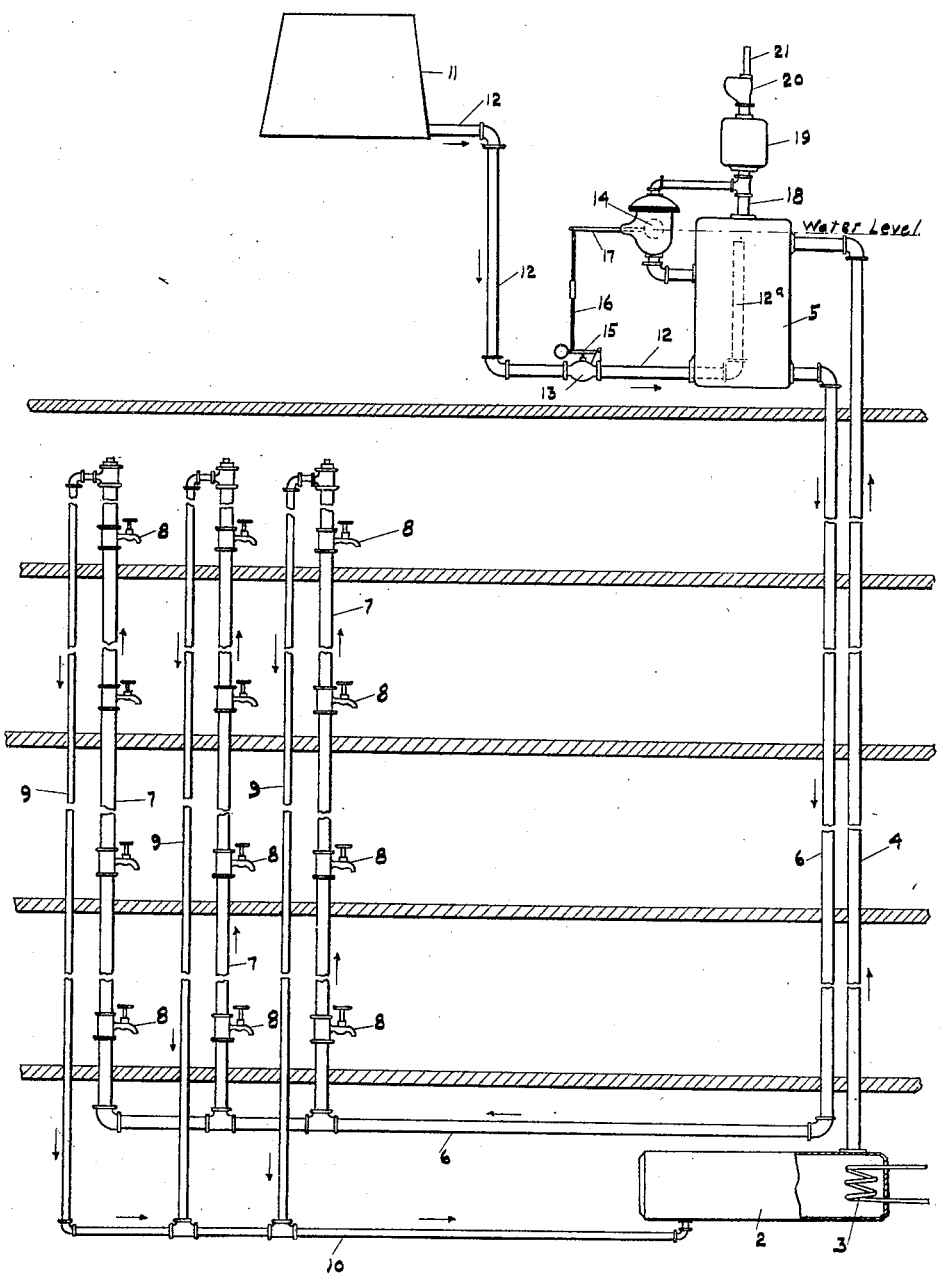

In the accompanying drawings, the numeral 2 designates a hot water heating tank, which may be of any approved design, and which may be heated in any desired manner, but which preferably is heated by means of a steam heating coil 3 arranged as shown in Figure 1. The heater 2 is provided with a hot water outlet which is connected to the lower end of the vertical pipe or riser 4, which opens, at its upper end, into the upper end of a tank 5, forming the combined deaerator and heat exchanger of my improved apparatus. The tank 5 has an outlet which is connected to the upper end of the vertical leg of a distributing pipe 6. This pipe 6 also has a horizontal leg which is connected to the lower end of the series of risers or vertical pipes 7 forming the hot water distributing system. Each riser or pipe 7 has a series of taps or faucets 8 which are located at convenient points in the length of the pipes 7. The upper end of each riser 7 is connected to the upper end of a circulation or return pipe 9, the lower ends of the return pipes 9 being connected to a main circulation or return pipe 10, and the discharge end of the main return 10 opens into the bottom portion of the heating tank 2.

From the foregoing and by reference to the arrows in Figure 1, it will be seen that circulation of the water through the entire system is maintained at all times, and that, even when no water is being withdrawn from the taps 8, the water will be caused to flow through the system. The water as it becomes heated in the heating tank 2, through the medium of the steam heating coil 3, will rise in the pipe 4 and will be delivered into the top of the deaerator and heat exchanger 5. The slightly colder water in the bottom of the deaerator 5 will descend through the return pipe 6 and be delivered to the supply mains 7 in readiness for use when desired. The water also will flow from the upper ends of the supply main 7 downwardly through the smaller circulation pipes 9 and return main 10 and again reach the heating tank 2. Suitable valves (not shown) will be provided on the piping at the necessary points so as to enable the water to be removed and the entire system drained when required.

An elevated storage tank 11, forming a source of cold water supply for the water heating system, preferably is used in connection with my improved apparatus. When employed this tank will be located at such elevation as will deliver water by gravity through the pipe 12 to the deaerating tank 5 in a manner similar to that shown in Figure 1. Obviously, however, the water may be pumped into the elevated deaerating tank 5, when found necessary or desirable.

A regulating valve 13 on the pipe 12 controls the flow of water from the storage tank 11 to the deaerator and heat exchanger 5. This valve is connected by the levers 15 and 17 and rod 16 to a float in the float chamber 14 or chamber mounted on the side of the tank 5, so that when the water falls below the level X in the tank 5, the float will be lowered and thereby open the valve 13. When the water level is re-established, the float will lift and in lifting will close the valve 13 and shut off the flow of cold water from the storage tank 11.

The discharge end of the supply pipe 12 is arranged to deliver the cold water to the tank 5 at a point about at the water level maintained in the tank, this discharge end of the supply pipe 12 extending vertically upward within the tank 5 from a point near the bottom of the tank. (See Figure 1.) By so arranging the inlet end of the water supply pipe, the head of the entering water is gradually reduced and the water emerges from the pipe 12 into the tank 5 under little or no head and without causing effervescence or any considerable agitation of the body of water within the tank.

The upper end of the tank 5 is connected by a pipe 18 to the inlet of an air or gas tank 19, and this air or gas tank 19 is provided on its upper end with an air or gas trap 20 and vent or escape pipe 21 through which the gases removed from the water escape and pass freely into the atmosphere.

Figure 2:
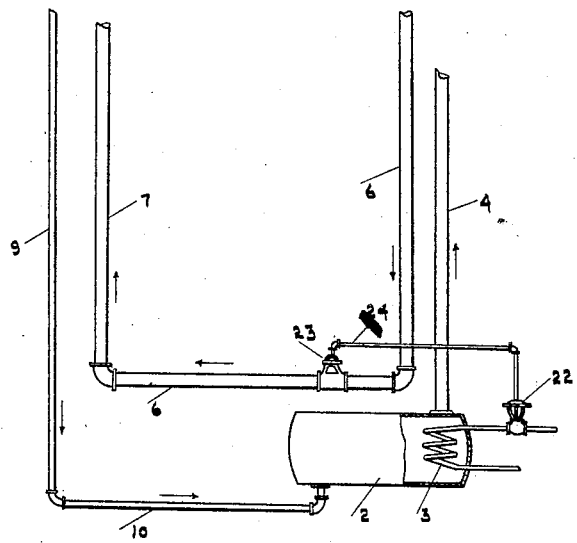
Figure 2 is an elevation, partly in section, of a portion of the apparatus of Figure 1, showing a modification, in which a thermostatic regulator is provided on the hot water riser connecting the hot water heater or generator with the heat exchanger and deaerating tank of the apparatus.

In the modified apparatus of Figure 2 the steam heating coil 3 by which the water in the heating tank 2 is heated is provided with a regulating valve 22 on the inlet side of the coil 3, and a thermostat 23 on the hot water supply pipe 6 leading from the deaerating tank 5 is operatively connected by the pipe 24 to the regulating valve 22 so that the heating of the water in the heating tank 2 may be automatically controlled and the water in the system maintained at a predetermined temperature.

Figure 3:
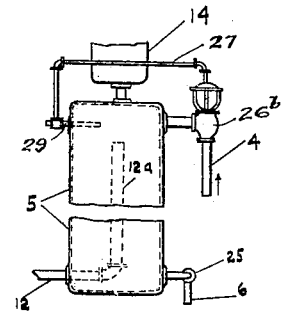
Figure 3 is a side elevation showing details of further modifications in the construction of the deaerating apparatus of Figure 1.

In the modification shown in Figure 3 a power driven circulating pump 25 is provided on the pipe 6 leading from the tank 5 to pump the heated and deoxidized or deaerated water from the tank into the pipes or risers 7. In this modified construction a diaphragm regulating valve $26^b$ also is provided on the riser 4, adjacent to the hot water inlet of the tank 5, and this valve $26^b$ is operatively connected by the pipe 27 to a thermostat 29 in the tank 5 near the water level established in the tank 5 so as to automatically regulate and control the hot water supply to the tank 5 by the temperature of the water in this tank.

Figure 4:
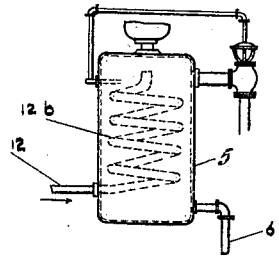
Figure 4 is an elevation showing another modification in the construction of the deaerating apparatus, which is adapted for use in practicing my invention.

In the modification shown in Figure 4 the vertical pipe $12^a$ of Figures 1 and 3 is replaced by a pipe coil $12^b$, its upper end opening into the tank 5 at or slightly below the water level in the tank 5. By using the coil $12^b$, a more effective exchange of heat between the body of heated water in the tank and the cold water entering from the storage tank 11 is obtained while the small bubbles of oxygen in the incoming water will quickly reach a point on the inner surface of the coil and will then travel on the inner surface of the coil towards its outlet and the bubbles in contacting with one another will coalesce and form larger bubbles which will facilitate the separation of the collected oxygen or other corrosive gases from the water as the water emerges from the cold water supply tank 11 into the tank 5.

Figure 5:
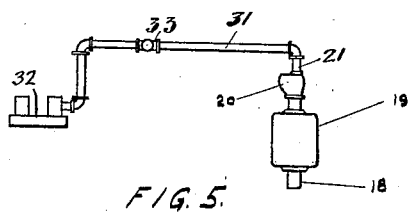
Figure 5 is a side elevation showing a further modification, having a vacuum forming mechanism applied to the deaerating apparatus in accordance with my invention.

The modification of Figure 5 is adapted for use with the apparatus of Figure 1, and comprises a vacuum producing mechanism on the upper end of the vent 21 of the air or gas trap 20. The vent 21 is connected by the pipe 31 to the inlet end of a vacuum pump 32, and a check valve 33 on the pipe 31 prevents back flow through the pipe 31 and vent 21 into the upper end of the tank 5. The vacuum pump 32 and its associated parts are adapted to maintain a slight vacuum in the space above the level of the water in the tank 5, so as to thereby hasten the deaeration of the water entering the tank 5.

In practicing my invention with the apparatus of Figures 1 and 2, the heating tank 2 and deaerator 5 and connecting piping will be filled with cold water from the storage tank 11, and enough water will be pumped into the tank 11 to refill it. Steam which may be live or exhaust steam, will be admitted to the heating coil 3 in the heating tank 2 in commencing the water heating operation. The water, as it starts to heat, will rise in the supply main 4 and will gradually displace the colder water in the tank 5. The displaced water flows downwardly into the supply main 6 and then into the series of risers 7 forming the hot water supply main, and finally flows through the series of circulation pipes 9 and circulation main 10 and again passes into the heating tank 2 to replace the water flowing upwardly in the supply 4.

This, as will be readily seen, starts a circulation through the system which will be maintained so long as steam is supplied to the heating coil 3 of the heating tank.

The water does not rise above the established level in the combined deaerating and heat exchanging tank 5. As the water filling the system gradually becomes heated and a circulation is established through the system, the dissolved oxygen in the water is freed in the deaerating tank 5 and will pass from the space above the water level of the tank 5 into the air or gas tank 19, and then escape through the air or gas trap 20 and vent 21 into the atmosphere.

When hot water is withdrawn, as is frequently, if not continually done, from one or more of the numerous taps or faucets 8 on the distributing pipes 7, the level of the heated water in the tank 5 will be lowered. When this occurs the float in the float chamber 14 will sink with the lowered water level, and, through the levers 15 and 17 and connecting links 16, will lift or open the regulating valve 13 on the water supply pipe 12, which connects the storage tank 11 with the cold water inlet of the tank 5. When the valve 13 opens, cold water will flow from the tank 11 into the deaerating and heat exchanging tank 5 until the water in this tank again reaches the predetermined level X, and the float in the chamber 14 will gradually lift and close the valve 13 and shut off the cold water supply. In flowing into the tank 5 from the tank 11 the water travels through the pipe 12ª and is gradually heated therein and the entering water is discharged into the open space above the level X of the water in the tank under a very slight head or pressure which enables collections of oxygen to easily and quickly separate from the water and pass upwardly and out of the vent 21 of the apparatus.

The modifications shown in Figures 2 to 5 are all in the form of additions to the apparatus of Figure 1, of which any or all may be employed.

It should be noted that all of the water which passes from the supply tank 11 must pass through the deaerator and heat exchanger 5 to reach the main pipe 6 leading to the pipes 7 of the hot water distributing system, so that the fresh water is always deaerated to lessen or eliminate its corrosive properties before entering the system. It will also be seen that all of the water entering the heating tank 2 is caused to circulate through the pipes 7 of the hot water distributing system and through the circulation pipes 9 and 10, and is, therefore, thoroughly deaerated before passing into the heating tank.

While the drawings show several forms of applying my invention, I do not wish to be limited thereto, as the drawings are simply illustrative, to enable others skilled in the art to understand my invention, and numerous changes can be made in the construction and arrangement of the apparatus without departing from the spirit and scope of my invention as defined in the appended claims.

I claim :—

1. A liquid treating system comprising a heating tank, a deaerator for separating dissolved gases from the liquid, piping forming circulating means for conducting heated liquid from the heating tank to the deaerator, and means for supplying additions of liquid to the system, said liquid supplying means being constructed and arranged to conduct the added liquid through the body of heated liquid within the deaerator to a point slightly below the liquid level, to thereby partly heat the additions of liquid prior to the mixing thereof with the heated liquid in said system.

2. A liquid treating system comprising a heating tank, a deaerator for separating dissolved gases from the liquid, piping forming circulating means for conducting heated liquid from the heating tank to the deaerator, and means for supplying additions of liquid to the system, said liquid supplying means comprising a supply tank elevated above said deaerator, a pipe extending downwardly from said supply tank and entering said deaerator adjacent its bottom and extending upwardly so that its outlet is slightly below the liquid level of said deaerator, to thereby conduct the added liquid supply through the body of heated liquid within the deaerator, heating the additions of liquid prior to the mixing thereof with the heated liquid and delivering said supply of liquid under little or no head, and eliminating any considerable agitation and effervescence of the body of water within the deaerator.

3. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid through the body of heated liquid within the deaerator to a point slightly below its water level to thereby partly heat the added liquid prior to the mixing thereof with the liquid in said system, and means controlled by the rise and fall of the liquid level within the deaerator for automatically regulating the addition of liquid to the system.

4. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator through the body of liquid within the deaerator, and means controlled by the temperature of the liquid in said deaerator for automatically regulating the circulation of liquid through the system.

5. A liquid treating system comprising a heating tank, a deaerator for separating dissolved gases from the liquid, piping forming circulating means for conducting liquid from the generator to the deaerator and from the deaerator to the generator, means for automatically supplying additions of liquid to the system, said liquid supplying means being constructed and arranged to deliver the added liquid into the upper end of said deaerator, through the body of liquid within the deaerator, and means controlled by the temperature of the liquid in the deaerator, for automatically regulating the supply of liquid from the heating tank to the deaerator.

6. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator through the body of liquid within the deaerator, means for heating the liquid in said heating tank, and means controlled by the temperature of the liquid in the system for automatically regulating the degree of heating of the liquid in said heating tank.

7. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator through the body of liquid within the deaerator, means controlled by the rise and fall of the liquid level within the deaerator for automatically regulating the volume of liquid added to the system, and means controlled by the temperature of the liquid in the system for automatically regulating the circulation of liquid through the system.

8. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator through the body of heated liquid within the deaerator, means controlled by the rise and fall of the liquid level within the deaerator for automatically regulating the volume of liquid added to the system, and means controlled by the temperature of the liquid in the deaerator for automatically regulating the circulation of liquid through the system.

9. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator, through the body of liquid within the deaerator, means controlled by the rise and fall of the liquid level within the deaerator for automatically regulating the volume of liquid added to the system, means controlled by the temperature of the liquid in the deaerator for automatically regulating the circulation of liquid through the system, means for heating the liquid in said heating tank and means controlled by the temperature of the liquid in the system for automatically regulating the degree of heating of the liquid in said heating tank.

10. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator, through the body of heated liquid within the deaerator, means controlled by the rise and fall of the liquid level within the deaerator for automatically regulating the volume of liquid added to the system, means for heating the liquid in said heating tank and means controlled by the temperature of the liquid in the system for automatically regulating the degree of heating of the liquid in said system.

11. A liquid treating system comprising a heating tank, a deaerator for separating dissolved gases from the liquid, piping forming circulating means for conducting liquid from the heating tank to the deaerator and from the deaerator to the heating tank, means for supplying additions of liquid to the system, said liquid supplying means being constructed and arranged to deliver the added liquid into the upper end of said deaerator through the body of liquid within the deaerator, and a vacuum producing mechanism on said deaerator whereby a partial vacuum is maintained above the liquid in the deaerator.

12. The combination with a water service system, having a hot water heating tank, a cold water supply, and a distributing system, of a heat exchanger and deaerating tank adapted to receive hot water from said heating tank and cold water from said supply and a gas tank and gas trap in communication with the upper end of said deaerating tank arranged to permit the escape of gases freed from the water in said deaerating tank.

13. A hot water system comprising, a hot water heating tank, an outlet pipe leading from said heating tank to a heat exchanger and deaerating tank, a gas vent on said deaerating tank, a cold water supply for said deaerating tank, means for automatically regulating the flow of cold water from said supply into said deaerating tank, an outlet pipe leading from said deaerating tank to a distributing system, and a return pipe leading from said system to said hot water heating tank and arranged to establish a circulation of water through the system.

14. A hot water system comprising a hot water heating tank, an outlet pipe leading from said heating tank to a heat exchanger and deaerating tank, a gas vent on said deaerating tank, a cold water supply for said deaerating tank, means for automatically regulating the flow of cold water from said supply into said deaerating tank, an outlet pipe leading from said deaerating tank to a distributing system, a return pipe leading from said system to said heating tank, and means for withdrawing the deaerated hot water from said system.

15. A water treating system comprising a heating tank, a deaerator for separating dissolved oxygen from the water, piping forming circulating means for conducting water from the heating tank to the deaerator and from the deaerator to the heating tank, means for supplying additions of water to the system, said water supplying means being constructed and arranged to deliver the added water through the body of heated water within the deaerator into the upper end of said deaerator, means controlled by the rise and fall of the water level within the deaerator for automatically regulating the volume of water added to the system, means controlled by the temperature of the water in the deaerator for automatically regulating the circulation of water through the deaerator, means for heating the water in said heating tank, and means controlled by the temperature of the water in said system for automatically regulating the degree of heating of the water in said system.

16. A liquid treating system comprising, a heating tank, a deaerator for separating dissolved gases from the liquid, a pipe connecting said deaerator and said heating tank, and other piping leading from said deaerator and returning to said heating tank, forming a circulating system, a gas tank and air trap in communication with the upper end of said deaerator for allowing the escape of the separated dissolved gases from the liquid in said deaerator, and means for supplying additional liquid to the system, said liquid supplying means being constructed and arranged to conduct the added liquid through the body of heated liquid within the deaerator to a point slightly below the liquid level to thereby partly heat the additions of liquid prior to the mixing thereof with the heated liquid in said system.

17. A liquid treating system comprising a heating tank, a deaerator for separating dissolved gases from the liquid, a pipe connecting said deaerator and said heating tank and other piping leading from said deaerator, and returning to said heating tank forming a circulating system, and means for supplying additional liquid to the system, said liquid supplying means being constructed and arranged to conduct the added liquid through the body of heated liquid within the deaerator to a point slightly below the liquid level to thereby partly heat the additions of liquid prior to the mixing thereof with the heated liquid in said system.

18. A liquid treating system comprising a heating tank, a deaerator for separating dissolved gases from the liquid, a pipe connecting said deaerator and said heating tank and other piping leading from said deaerator, and returning to said heating tank forming a circulating system, a gas tank and gas trap in communication with the upper end of said deaerator for allowing the escape of the separated dissolved gases from the liquid in said deaerator, and means for supplying additions of liquid to the system, said liquid supplying means comprising, a supply tank elevated above said deaerator, a pipe extending downwardly from said supply tank and entering said deaerator adjacent its bottom and extending upwardly so that its outlet is slightly below the liquid level of said deaerator, to thereby conduct the added liquid supply through the body of heated liquid within the deaerator, heating the additions of liquid prior to the mixing thereof with the heated liquid, and delivering said supply of liquid under little or no head and eliminating any considerable agitation and effervescence of the body of water within the deaerator.

19. A liquid treating system comprising a heating tank, a deaerator for separating dissolved gases from the liquid, a pipe communicating with the top of said heating tank and slightly below the top of said deaerator and other piping leading from adjacent the bottom of said deaerator and returning to the heating tank forming a circulating system, a gas tank and gas trap in communication with the upper end of said deaerator for allowing the escape of the separated dissolved gases from the liquid in said deaerator, and means for supplying additional liquid to the system, said liquid supplying means being constructed and arranged to conduct the added liquid through the body of heated liquid within the deaerator to a point slightly below the liquid level to thereby partly heat the additions of liquid prior to the mixing thereof with the heated liquid in said system.

20. A liquid treating system comprising, a heating tank, a deaerator for separating dissolved gases from the liquid, a pipe communicating with the top of said heating tank and slightly below the top of said deaerator and other piping leading from adjacent the bottom of said deaerator and returning to the heating tank forming a circulating system, and means for supplying additional liquid to the system, said liquid supplying means being constructed and arranged to conduct the added liquid through the body of heated liquid within the deaerator to a point slightly below the liquid level to thereby partly heat the additions of liquid prior to the mixing thereof with the heated liquid in said system.

21. A liquid treating system comprising a heating tank, a deaerator for separating dissolved gases from the liquid, a pipe communicating with the top of said heating tank and slightly below the top of said deaerator and other piping leading from adjacent the bottom of said deaerator and returning to the heating tank forming a circulating system, a gas tank and gas trap in communication with the upper end of said deaerator for allowing the escape of the separated dissolved gases from the liquid in said deaerator, and means for supplying additions of liquid to the system, said liquid supplying means comprising a supply tank elevated above said deaerator, a pipe extending downwardly from said supply tank and entering said deaerator adjacent its bottom and extending upwardly so that its outlet is slightly below the liquid level of said deaerator, to thereby conduct the added liquid supply through the body of heated liquid within the deaerator, heating the additions of liquid prior to the mixing thereof with the heated liquid and delivering said supply of liquid under little or no head, and eliminating any considerable agitation and effervescence of the body of water within the deaerator.

In testimony whereof I have hereunto set my hand.

JOSEPH F. MUSSELMAN.